United States Patent
Pinto et al.

(10) Patent No.: US 8,984,530 B2
(45) Date of Patent: Mar. 17, 2015

(54) QUEUED MESSAGE DISPATCH

(75) Inventors: Edmund Samuel Victor Pinto, Duvall, WA (US); Kenneth David Wolf, Seattle, WA (US); Stephen J. Millet, Edmonds, WA (US); Richard D. Hill, Kirkland, WA (US); Nicholas Alexander Allen, Redmond, WA (US); John Anthony Taylor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1693 days.

(21) Appl. No.: 12/023,993

(22) Filed: Jan. 31, 2008

(65) Prior Publication Data

US 2009/0199208 A1     Aug. 6, 2009

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| H04L 12/801 | (2013.01) |
| H04L 12/861 | (2013.01) |

(52) U.S. Cl.
CPC ............... *G06F 9/546* (2013.01); *H04L 47/12* (2013.01); *H04L 49/90* (2013.01)
USPC .......................................... 719/313; 719/718

(58) Field of Classification Search
None
See application file for complete search history.

(56) References Cited

U.S. PATENT DOCUMENTS

| | | | |
|---|---|---|---|
| 5,802,310 A | 9/1998 | Rajaraman | |
| 6,401,145 B1 | 6/2002 | Baskey et al. | |
| 6,922,414 B1 | 7/2005 | Gunlock | |
| 6,950,669 B2 | 9/2005 | Simonsson | |
| 7,200,676 B2 | 4/2007 | Christensen et al. | |
| 2006/0069596 A1 | 3/2006 | Hatoun et al. | |
| 2007/0177195 A1 | 8/2007 | Rebert et al. | |
| 2008/0298363 A1 * | 12/2008 | Ban et al. | 370/390 |

OTHER PUBLICATIONS

GSFL: A Workflow Framework for Grid Services (13 pages) http://users.sdsc.edu/~sriram/publications/gsfl.pdf.
Workflow Message Queue's Performance Effect Measurements on an EJB-Based Workflow Management System (12 pages) http://www.springerlink.com/content/323n65432874x31t/fulltext.pdf.
XML-enabled Workflow Management for E-Services across Heterogeneous Platforms (19 pages) http://citeseer.ist.psu.edu/cache/papers/cs/14983/http:zSzzSzwww-dbs.cs.uni-sb.dezSz~gillmannzSzPublicationszSzXML-TES.pdf/shegalov01xmlenabled.pdf.

* cited by examiner

*Primary Examiner* — Craig Dorais
(74) *Attorney, Agent, or Firm* — Ben Tabor; Alin Corie; Micky Minhas (57) ABSTRACT

Embodiments described herein allow a service component author to write service components without having to handle incoming messages being received at any time. This may be facilitated by a message dispatch engine that dispatches messages from the incoming message queue only when the destination service component has indicated that it is ready to receive the message having that context. If the service component is not yet ready for the message, the message dispatch component may lock the message at least until the destination service component indicates that it is now ready to receive the message. Until that time, the message dispatch engine may ignore the locked message when finding messages to dispatch.

19 Claims, 4 Drawing Sheets

QUEUED MESSAGE DISPATCH

BACKGROUND

Our modern connected world is facilitated by message processors communicating messages back and forth. A message processor may be quite complex such as a fully capable computing system or even a collection of computing systems. Message processors frequently use queues to exchange messages reliably while providing isolation between message processors. Queues allow message processors requesting a service (i.e., "clients") to send messages at any time without requiring a direct connection to the message processor (i.e., the "service") providing the service.

In such a message processing service, clients may send messages to the service by sending messages that address the service. In order to handle perhaps a continuous receipt of messages, the messages are first placed in a queue until they are processed by the message processing components of the service. Accordingly, the queue may at any given time contain zero or more messages, where messages may be continually provided to the queue by one or more clients, and where messages may be continually drawn from the queue by one or more message processing components of the service. This is called "continuous message processing".

Accordingly, in continuous message processing, the message processing component should be authored to handle incoming messages at any time. Such a task may be difficult but is important in order to guarantee that the service can handle incoming messages, and that messages will not be lost.

BRIEF SUMMARY

Embodiments described herein allow a message processing component (also called a "service component") author to write service components without having to handle any type of possible message being received at any time. In one embodiment, this is facilitated by a message dispatch engine that dispatches message from the incoming message queue only when the destination service component has indicated that it is ready to receive the message. In one embodiment, if the service component is not yet ready for the message, the message dispatch component locks the message at least until the destination service component indicates that it is now ready to receive messages. Until that time, the message dispatch engine may ignore the locked message when finding messages from the queue to dispatch.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a message dispatch engine dispatches a message from the incoming message queue only when the destination service component has indicated that it is ready to receive the message. In one embodiment, if the service component is not yet ready for the message, the message dispatch component locks the message at least until the destination service component indicates that it is now ready to receive the message. Until that time, the message dispatch engine may ignore the locked message when finding messages from the queue to dispatch. This allows a service component to handle messages when it indicates that the service component is ready, rather than requiring the service component to handle any type of message at any time.

First, some introductory discussion regarding message processors will be described with respect to FIGS. 1A and 1B. Then, various embodiments of a message dispatch engine will be described with respect to FIGS. 2 and 3.

A message processor may be implemented in software or hardware, or a combination thereof. FIG. 1A illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

Figure 1A:
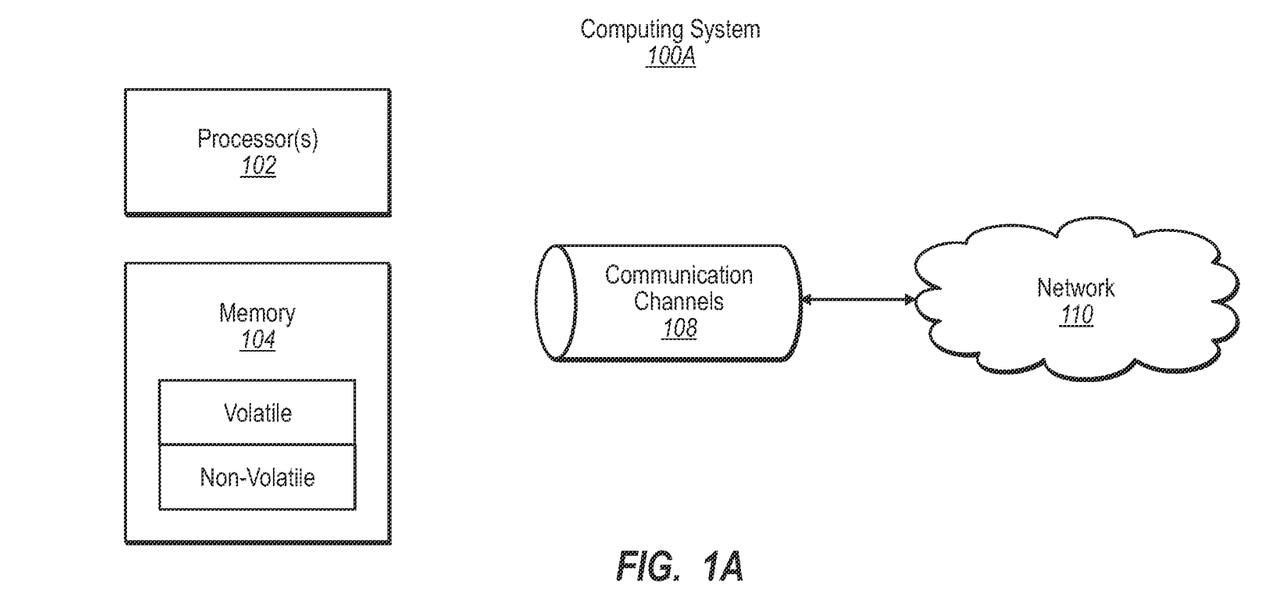
FIG. 1A illustrates one example of a message processor in the form of a computing system.

FIG. 1A illustrates a message processor in the form of a computing system 100A. In its most basic configuration, a computing system 100A typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). However, as will be described further below with respect to FIG. 1B, the message processor may be implemented as a state machine as well, perhaps even fully in hardware.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100A.

Computing system 100A may also contain communication channels 108 that allow the computing system 100A to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 1B:
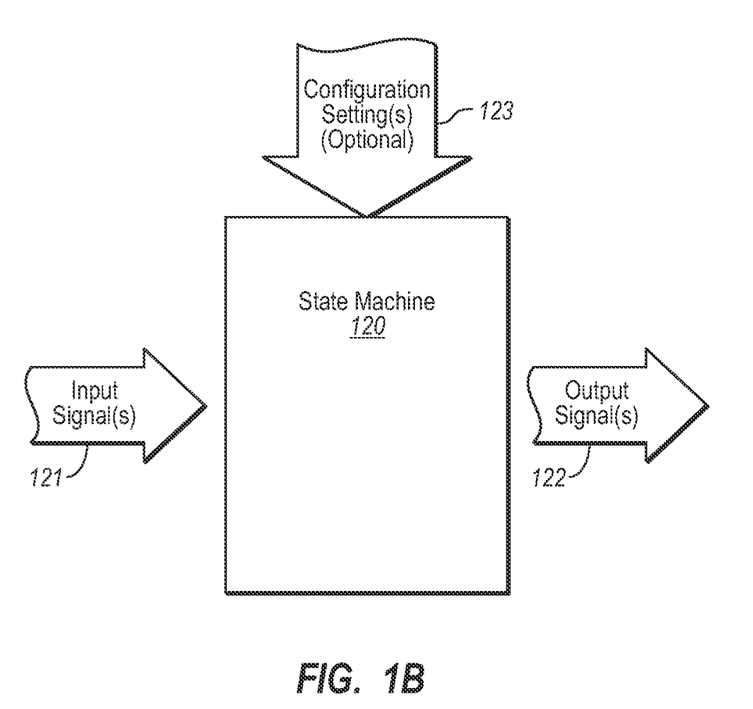
FIG. 1B illustrates another example of a message processor in the form of a state machine.

FIG. 1B illustrates a message processor in the form of a state machine 120. A state machine 120 may be implemented entirely in hardware, although that need not be the case. The state machine 120 receives input signal(s) 121, and deterministically generates output signal(s) 122. Optionally, the deterministic function may depend on one or more optional configuration settings 123. In one embodiment, the state machine 120 may be implemented using logic gates and potentially other circuit components such as perhaps registers and clocks. When implemented as a message processor, the state machine 120 may perform the message dispatch described herein.

Figure 2:
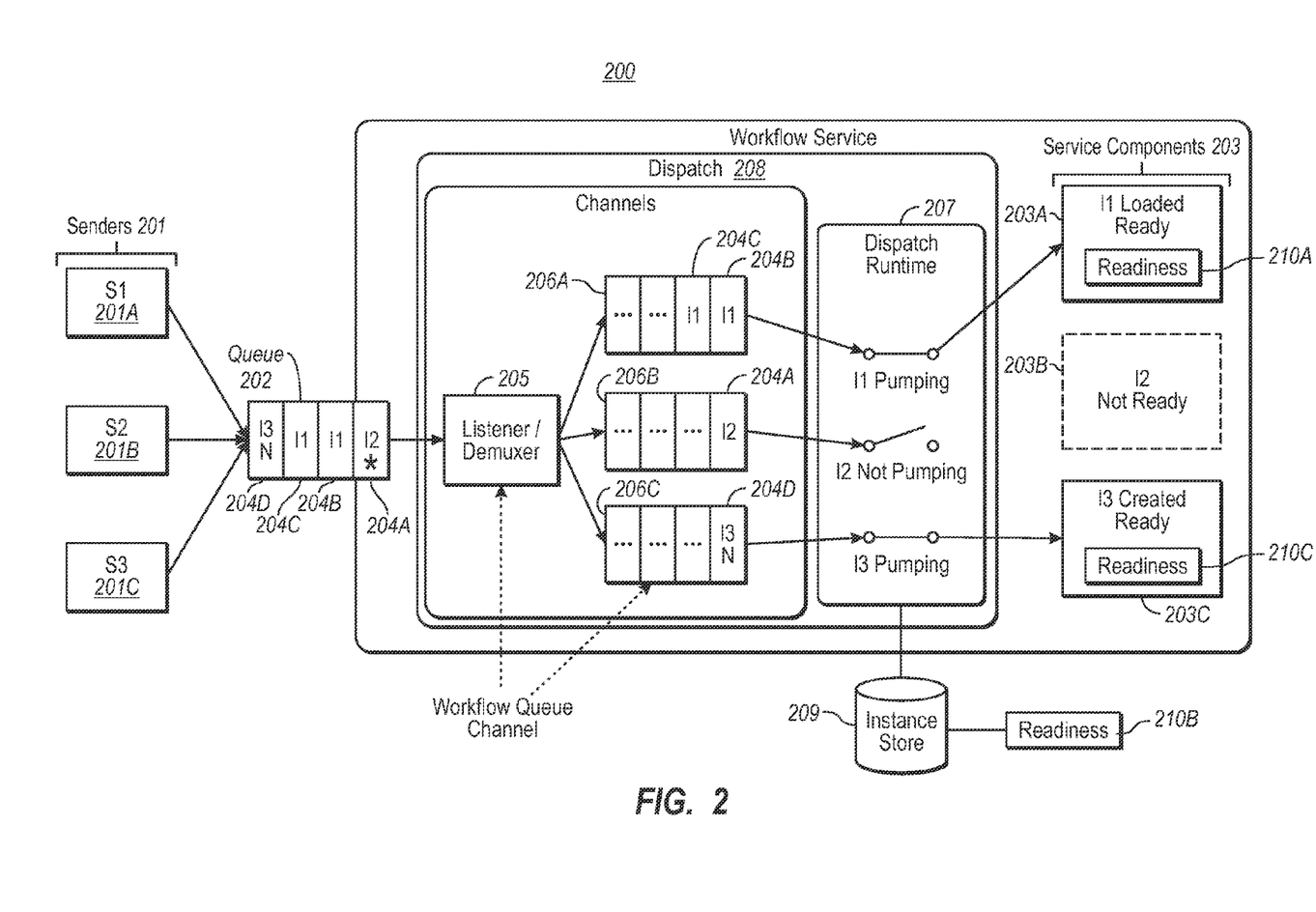
FIG. 2 schematically illustrates a message dispatch environment.

Now that example message processors have been described, FIG. 2 will now be described, which illustrates a particular messaging processing environment 200. The various illustrated components may be implemented in software or hardware. For instance, if a given component is implemented in software, the computing system 100A of FIG. 1A may cause the component to be created and operated by the processor(s) 102 executing computer-executable instructions from the memory 104. If implemented in hardware, the component may be a computing system or device.

The message processing environment 200 includes senders 201 that send messages into an incoming message queue 202. In the specific illustrated embodiment, there are three senders: sender 201A (also referred to as "sender S1"), sender 201B (also referred to as "sender S2") and sender 201C (also referred to as "sender S3") that send message into the queue 202, although there may be any number of senders sending messages into the incoming message queue 202. Each sender may be any message processor capable of generating a message. The senders may be, for example, a computing system, a state machine, a process, or any other system, device or component. One, some, or even all of the senders 201 may even be on the same physical machine as the incoming message queue 202. However, the senders may also perhaps send messages over a network. For instance, in the case of FIG. 1A, messages may be sent over network 100.

Each incoming message is received into an incoming message queue (act 303). For instance, referring to FIG. 2, the messages 204A, 204B, 204C and 204D sent by respective ones of the senders 201 are received into the incoming message queue 202. Note that message 204A is annotated with I2 representing that its destined service component is service component 203B (I2) being sent by sender 201B. Messages 204B and 204C are annotated with I1 representing that their destined service component are both service component 203A (I1) being sent by sender 201A. Finally, message 204D is annotated with I3 representing that its destined service component is service component 203C (I3) being sent by sender 201C. The destined service component may be identified for each message inside the queue 202 itself. Alternatively or in addition, the destined service component for any given message might be inferred at least partially based on the contents of the message at the time the message is pulled from the queue.

Note further that message 204D is further annotated with "N", which symbolically represents that, at least as of the time that the message 204D is received into the incoming message queue 202, its corresponding destined service component 203C may not yet exist.

The message dispatch engine 208 is shown as including channels 206A through 206C, one for each service instance. The channels are represented as queues, with queue 206A including messages for service component 203A, queue 206B including messages for service component 203B, and queue 206C including message for service component 203C. Alternatively, these queues may not actually exist, but may be simply thought of as logical constructs of the listener 205.

The message processing environment 200 also includes service components 203, each potentially capable of receiving incoming messages. Each of the senders 201 are sending messages into the queue 202 destined for a particular service component. For instance, sender S1 sends messages 204B and 204C to the service component 203A (also referred to as "instance I1"), which is loaded so as to be operational, and is ready for receiving messages. The service component 203A provides service readiness information to the message dispatch engine 208. This service readiness information indicates by context, which messages are ready to be received, and which messages are not. This readiness information is represented as readiness information 210A in FIG. 2.

Sender S2 sends message 204A to the service component 203B. However, the service instance is not in memory. Instead, the service component 203B (or at least its relevant state) is persisted in the instance store 209. The process of taking an in-memory representation of a component, and providing that component (or at least its relevant state) to persistent storage may also be referred to herein as "dehydrating" the component. To find out whether or not the service component 203B is ready to receive a message having a particular context, the service readiness information 210B is accessed from the persistent store. The service readiness information 210B may be part of the state of the service component that is persistent when the service module was last dehydrated from memory into storage. Once again, the service readiness information 210B identifies whether or not the service component is ready to receive a message having a particular context.

Sender S3 sends message 204D to the service component 203C. At the time the sender S3 sent the message 204D, perhaps the service component 203C is not yet created. As will be described hereinafter with respect to FIG. 3, the receipt of the message 204D causes the service component 203C to be created and made ready for the message 204D. Therefore, the context of the incoming message will indicate that it is an activation message. Upon instantiation of the service instance, the service component will, by definition, be ready for a message having an activation context. Accordingly, the service readiness information 210C will indicate that the newly created service component 203C is ready to receive that message, but might not be ready to receiving messages after the activation message.

The message processing environment 200 includes a message dispatch engine 208 that is capable of dispatching various messages from the incoming message queue 202 depending on service readiness information. The service readiness information represents whether or not each of the service components 203 are ready to receive messages. The message dispatch engine 208 operates to 1) access a message within the incoming message queue, 2) identify a destined service component for the accessed message, 3) access service readiness information for the service components, and 4) determine based on the service readiness information whether or not the destined service component is ready for the message. If the message dispatch engine 208 determines that the service component is ready for the message, the message dispatch engine 208 provides the message to the destined service component. If the message dispatch engine 208 determines that the service component is not ready for the message, the message dispatch engine refrains from providing the message to the destined service component, at least until the service readiness information 210 indicates that the destined service component is ready to receive the message. These and other features of the message dispatch engine will be described further with respect to FIG. 3.

Figure 3:
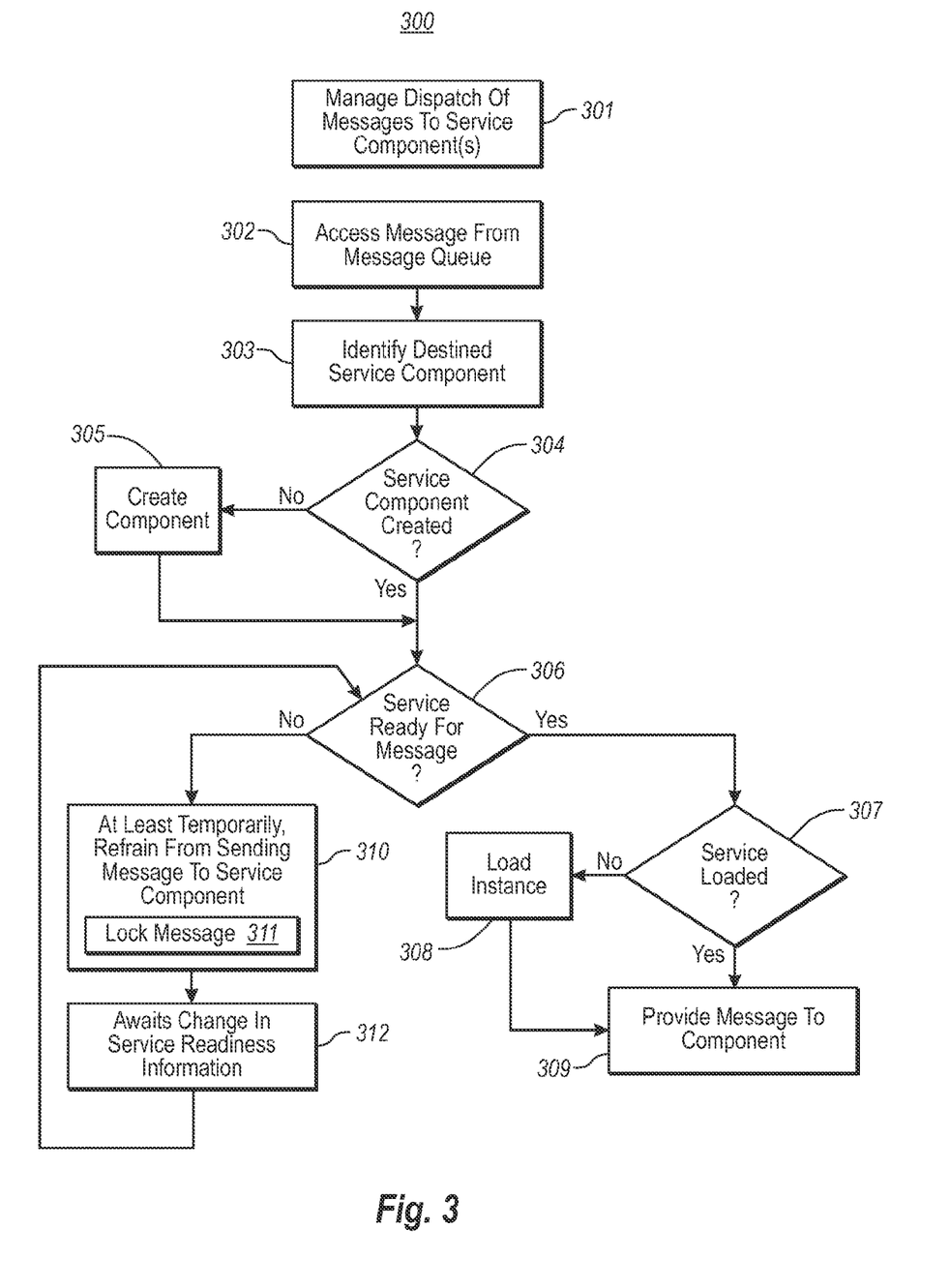
FIG. 3 illustrates a flowchart of a method for performing message dispatch in accordance with one embodiment.

FIG. 3 illustrates a flowchart of a computer-implemented method 300 for dispatching an incoming message. The method 300 may be performed by the message dispatch engine 208 of FIG. 2. The method 300 includes an act of the message dispatch engine managing dispatch of messages to the service components (act 301). This act 301 is listed alone to represent that one or more of perhaps all of the other illustrated acts may accomplish this act 301. The remainder of the method 300 may be performed each time the message dispatch engine accesses a message from the incoming message queue (act 302). Note that the incoming message queue 202 acts to receive messages. These messages are not necessarily acted upon immediately by the message dispatch engine, but may remain in the incoming message queue for some time. The method 300 is initiated once the message dispatch engine accesses the message. This allows isolation between when messages are received, and when they are handled. Thus, the service components need not be authored to necessarily handle messages at any time. This significantly simplifies the complexity behind authoring service components.

The message dispatch engine 208 identifies the service component that the message is destined for (act 303). This may be done by simply reading the destination of the message from the message itself. If the destined service component is not yet created (No in decision block 304), then a new channel is created for that service component, and the service component is created (act 305). Alternatively, if the service component is already created (Yes in decision block 304), then there is no need to once again create the service component.

Furthermore, the method 300 includes an act of the message dispatch component having access to the service readiness information (act 306). Referring to FIG. 2, if the service component is already instantiated in memory, the service component object may itself report whether or not it is ready for messages based on the context of the message. If the service component is dehydrated into persistent memory, the service readiness information may be acquired from persistent memory perhaps as part of the persistent state information associated with that service component. In the process of creating a new service component (in act 305), that service component might report (or it may be implicit) that the newly created service component is ready to receive messages that have an activating context (indicating that they are activating messages that cause a new service component instance to be created). If the destined service component for a particular message is not yet created (No in decision block 304), but the message does not include an acceptable activating context (i.e., the service is not ready for the message), then the dispatcher refrains from delivering the message in one embodiment.

Once a particular message is accessed from the incoming message queue 202 (act 302), and given that the message dispatch engine 208 has access to the service readiness information and the message context, the message dispatch engine 208 then determines based on the service readiness information whether or not the destined service component has indicated that it is ready for incoming messages having that context (decision block 306).

In one embodiment, the queue 202 is configured with a context channel which perhaps supports context exchange protocol or cookie based context exchange. The context channel may support the ability for the sender to specify the context to be used by the server for correlating further messages from the sender. In sum, the context channel supports the association of appropriate context for each received message.

Alternatively or in addition, the queue 202 is configured to be read by a workflow queue channel, which may support peek lock dequeuing of messages and demuxing of the messages based on the context associated with the message. The workflow queue channel will create a channel per unique context. If a message arrives whose context does not match any of the existing channels, a new channel is created. For instance, messages 204B and 204C are received with a context that matches channel 206A. Accordingly, a channel already exists for the messages 204B and 204C and thus these messages are assigned to the channel 206A providing messages to the service component 203A. Message 204A is received with a context that matches channel 206B. Accordingly, a channel already exists for the message 204A and the message 204A is assigned to the channel 206B providing messages to the service component 203B.

However, recall that at the time the message 204D is received, there is not yet a channel for delivering messages to its destined service component 203C. In fact, the service component 203C may not have even been created yet. Accordingly, the context associated with the message 204D will not match any of the existing channels. In this case, the message dispatch component 208 may create a channel 206C. In one embodiment, channels are distinguished based on predetermined parts of the context including, for example, the instance identifier for the destined service component, or perhaps the designated name for the service component.

If the message dispatch engine 208 determines that the destined service component is ready to receive the incoming message (Yes in decision block 306), the message dispatch engine 208 takes different action depending on whether or not the service component is loaded (decision block 307). If the service component is not yet loaded into memory (No in decision block 307), the service component instance is loaded (act 308), and the message is provided to the service component (act 309). Otherwise, if the service component is already loaded into memory (Yes in decision block 307), the service component instance is provided the message (act 309) without any need to load the service component instance.

If, on the other hand, the message dispatch engine 208 determines that the destined service component is not ready to receive the incoming message (No in decision block 306), the message dispatch engine at least temporarily refrains from sending the message to the corresponding destined service component (act 310). Referring to FIG. 2, for example, the message 204A is destined for service component 203B, which is not ready for the message as represented in the service readiness information 210B. Accordingly, the dispatch runtime 207 initially refrains from providing messages 204A to the service component 203B (act 310), and awaits a change in the service readiness information of the service component (act 312). Should the readiness information for the service component 203B change to indicate that the service component 203B becomes ready for message having that particular context, then message 204A may be provided to the service component.

In order to facilitate the refraining to send the message (act 310) in the case where the destined service component is not yet ready (No in decision block 306), the message dispatch engine may lock the message within the incoming message queue. For instance, in FIG. 2, since destined service component 203B is not yet ready for a message, the message 204A may be locked within the queue 202. This is symbolically represented by the message 204A being annotated with an asterisk within the queue 202. In this locked state, this message will be ignored by the message dispatch engine 208 when the engine 208 searches the queue 202 for the next message to dispatch.

As represented in FIG. 3, should the service readiness information 210 change to indicate that the destined service component is now ready (Yes in decision block 306), then the message may be dispatched to the appropriate destined service component (act 309) after being loaded (act 308) if necessary. The method 300 may be repeated for each message present in the incoming message queue.

The service readiness information 210 may be changed by the message dispatch engine 208 as it detects a change in the readiness state of any of the destined service components. Alternatively or in addition, the service components themselves may also change the service readiness information as they notice that their readiness information changes.

In one embodiment, the service readiness information may indicate one or more preconditions. For instance, perhaps the service component is ready provided that 1) the processing capacity of the computing system is less than 80%, 2) that it is not between 2 am and 3 am Eastern Standard Time, or any other conceivable preconditions.

Accordingly, the embodiments described herein present an effective mechanism for dispatching message while alleviating the service component from having to continuously receive messages, expecting to receive any message at any time. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for dispatching an incoming message, the method comprising:
    an act of a message dispatch engine managing dispatch of messages to a plurality of service components;
    an act of the message dispatch engine accessing service readiness information representing whether or not each of the plurality of service components are ready to receive messages;
    an act of placing an incoming message destined for a service component of the plurality of service components into an incoming messages queue for receiving incoming messages;
    for each message in the incoming messages queue, identifying which of the plurality particular service components is to service the each message;
    determining whether the destined service component has been created;
    when the destined service component has been created, determining whether the destined service component has been persisted in the persistent store;
    when the destined service component has been created but has been persisted in the persistent store, determining whether the service component is ready to receive a message having a particular context by accessing service readiness information from the persistent store;
    when it has been determined that the destined service component has not been created, creating the destined service component;
    for each message in the incoming messages queue, annotating the each message with an identification of the which of the plurality particular service components is to service the each message; and
    an act of the message dispatch engine determining, based on the service readiness information, whether or not the destined service component has indicated that it is ready to receive and process the incoming message.

2. The method of claim 1, wherein the act of the message dispatch engine determining comprises an act of determining that the destined service component is ready to receive the incoming message, the method further comprising:
    an act of providing the incoming message from the incoming message queue to the destined service component.

3. The method of claim 1, wherein the act of the message dispatch engine determining comprises an act of determining that the destined service component is not ready to receive the incoming message, the method further comprising:

at least until the service readiness information changes for the destined service component, an act of refraining from providing the incoming message from the incoming message queue to the destined service component.

4. The method of claim 3, further comprising:

at least until the service readiness information changes for the destined service component, an act of locking the incoming message in the incoming message queue such that the incoming message is ignored when the message dispatch engine searches the queue for other messages to dispatch.

5. The method of claim 4, further comprising:

subsequent to the act of locking, an act of the message dispatch engine determining that the destined service component is now ready to receive the incoming message; and in response to the act of the message dispatch engine determining that the destined service component is now ready to receive the incoming message, an act of the message dispatch engine providing the incoming message to the destined service component.

6. The method of claim 2, wherein the incoming message is one incoming message, a first incoming message, and the destined service component is one destined service component, a first destined service component, the method further comprising:

an act of placing another incoming message, a second incoming message, destined for another service component, a second incoming message, of the plurality of service components into the incoming messages queue for receiving incoming messages;

an act of the message dispatch engine determining based on the service readiness information that the second destined service component is not ready to receive and process the second incoming message; and at least until the service readiness information changes for the second destined service component, an act of refraining from providing the second incoming message from the incoming message queue to the second destined service component.

7. The method of claim 1, wherein the service readiness information for at least some of the plurality of service components is dependent upon context of the message, wherein a particular service component might be ready for messages having one context but not ready for messages having another context, wherein the act of the message dispatch engine determining based on the service readiness information whether or not the destined service component has indicated that it is ready to receive and process the incoming message, comprises:

an act of the message dispatch engine determining based on the service readiness information and a context of the incoming message whether or not the destined service component has indicated that it is ready to receive and process the incoming message.

8. The method of claim 1, wherein at least one of the plurality of service components is instantiated in memory, wherein the service readiness information is provided by at least one of the instantiated service components.

9. The method of claim 1, wherein at least one of the plurality of service components is persisted in persistent storage, wherein the service readiness information is provided from persistent storage.

10. A method in accordance with claim 1, wherein the incoming message has a particular context, and wherein the service readiness information indicates that the destined service component is not ready to receive incoming messages of that context, but indicates that the destined service component is ready to receive incoming messages of one or more other contexts.

11. A method in accordance with claim 10, wherein the act of the message dispatch engine determining based on the service readiness information whether or not the destined service component has indicated that it is ready to receive and process the incoming message comprises the following:

an act of determining that the destined service component is not yet ready for an incoming message of the particular context based on the service readiness information for the destined service component, even though the destined service component would be ready to receive an incoming message of the one or more other contexts designated in the service readiness information.

12. A computer-implemented method for dispatching an incoming message, the method comprising:

an act of placing an incoming message destined for a service component of a plurality of service components into an incoming messages queue;

for each message in the incoming messages queue, identifying which of the plurality particular service components is to service the each message;

for each message in the incoming messages queue, annotating the each message with an identification of the which of the plurality particular service components is to service the each message;

determining whether the destined service component has been created;

when the destined service component has been created, determine whether the destined service component has been persisted in the persistent store;

when the destined service component has been created but has been persisted in the persistent store, determining whether the service component is ready to receive a message having a particular context by accessing service readiness information from the persistent store;

when it has been determined that the destined service component has not been created, creating the destined service component;

an act of a message dispatch engine receiving service readiness information;

determining from the service readiness information that the destined service component for the message is not yet ready to receive and process the message; and at least until the service readiness information changes for the destined service component, an act of locking the incoming message in the incoming message queue such that the incoming message is ignored when the message dispatch engine searches the queue for other messages to dispatch.

13. The method of claim 12, further comprising:

subsequent to the act of locking, an act of the message dispatch engine determining that the destined service component is now ready to receive the message.

14. The method of claim 13, further comprising:

in response to the act of the message dispatch engine determining that the destined service component is now ready to receive the message, an act of the message dispatch engine providing the incoming message to the destined service component.

15. The method of claim 12, further comprising:

in response to the act of determining that the destined service component is not ready to receive the incoming message, an act of the message dispatch engine causing the destined service component to become ready for the incoming message by causing the destined service component to be instantiated.

16. The method of claim 12, wherein the service readiness information for at least some of the plurality of service components is dependent upon context of the message, wherein a particular service component might be ready for messages having one context but not ready for messages having another context, wherein the act of the message dispatch engine determining based on the service readiness information whether or not the destined service component has indicated that it is ready to receive and process the message comprises:
an act of the message dispatch engine determining, based on the service readiness information and a context of the incoming message, whether or not the destined service component has indicated that it is ready to receive and process the message.

17. The method of claim 12, wherein at least one of the plurality of service components is instantiated in memory, wherein the service readiness information is provided by at least one of the instantiated service components.

18. The method of claim 12, wherein at least one of the plurality of service components is persisted in persistent storage, wherein the service readiness information is provided from persistent storage.

19. A computer program product comprising one or more physical computer-readable storage media having thereon computer-executable instructions that are structured such that, when executed by one or more processors of a computing system, the following are caused to be instantiated in one or more memories of the computing system;
an incoming messages queue configured to receive a plurality of incoming messages; a plurality of service components, each potentially capable of receiving at least one incoming message; and
a message dispatch engine configured to:
access a message within the incoming message queue,
identify a destined service component for the accessed message,
determine whether the destined service component has been created;
when the destined service component has been created, determine whether the destined service component has been persisted in the persistent store;
when the destined service component has been created but has been persisted in the persistent store, determine whether the service component is ready to receive a message having particular context by accessing service readiness information from the persistent store;
when it has been determined that the destined service component has not been created, create the destined service component;
access service readiness information for the plurality of service components,
determine based on the service readiness information whether or not the destined service component is ready to receive and process the message,
when it determines that the service readiness component is ready for the message, provide the message to the destined service component, and
when it determines that the service readiness component is not ready for the message, refraining from providing the message to the destined service component, at least until the service readiness information indicates that the destined service component is ready to receive the message.

* * * * *